United States Patent
Armstrong (10) Patent No.: US 9,678,365 B2
(45) Date of Patent: Jun. 13, 2017

(54) REAR LENS

(71) Applicant: Brawnski Lee Armstrong, North Hollywood, CA (US)

(72) Inventor: Brawnski Lee Armstrong, North Hollywood, CA (US)

(73) Assignee: Brawnski L. Armstrong, Farmington Hills, MI (US)

( * ) Notice: Subject to any disclaimer, the term of this patent is extended or adjusted under 35 U.S.C. 154(b) by 96 days.

(21) Appl. No.: 14/850,929

(22) Filed: Sep. 10, 2015

(65) Prior Publication Data

US 2017/0075145 A1   Mar. 16, 2017

Related U.S. Application Data

(60) Provisional application No. 62/048,344, filed on Sep. 10, 2014.

(51) Int. Cl.
*G02C 7/14* (2006.01)
*G02C 9/00* (2006.01)
(Continued)

(52) U.S. Cl.
CPC ............ *G02C 7/14* (2013.01); *A42B 3/0426* (2013.01); *G02B 7/1824* (2013.01); *G02C 9/00* (2013.01); *G02C 2200/20* (2013.01)

(58) Field of Classification Search
USPC ........................................... 351/50
See application file for complete search history.

(56) References Cited

U.S. PATENT DOCUMENTS 5,917,667 A * 6/1999 Turner ................ A42B 3/0426
                                                    2/209.14

* cited by examiner

*Primary Examiner* — Jack Dinh (57) ABSTRACT

A rearview mirror that is attached to the front surface; left or right side, of any type of eyewear where rear viewing is needed, but especially designed with sportswear in mind. This design is unique because of how and it is attached; to the surface of the eyewear by so-called socketed suction cup; truly held on by atmospheric pressure. The cup being about ¼" inch in diameter can hold on with about 4 lbs of force with a gentle touch because it is made of pliable rubber. The interior of the suction cup has a ball socket housing; both socket and suction cup is all one piece. The stem and ball, is a part of the plastic housing, which encases the mirror, which is all one piece, with smooth rounded edges for safety. The plastic housing exterior acts as an airfoil plate, designed and shaped in such a way to give way to the wind, and cause less turbulence. The ball and socket allows the mirror to swivel in all directions from 0-45 degrees of adjustment in angle, which is adjusted by hand. The mirror can be placed laterally across the eyewear lens also for adjustment without obscuring the frontal view. Facing straight ahead with a slight glance of the eye to the left (right if placed on the right side) as you would do when driving an automobile, you will get 40 to 70 degree rearward view while looking straight ahead; approximately ⅞ by 1½ inch wide mirror. The mirror will enable the user to complete a 365-degree viewing area with only a 45-degree turn of the head to a left then right direction. The mirror is placed in a strategic position on the lens of the eyewear in close proximity to the eye, but not an off-to-the side angle that can strain the eye. This slight 20-degree glance, affords the eye a wide field of view.

17 Claims, 8 Drawing Sheets

(51) Int. Cl.
*A42B 3/04* (2006.01)
*G02B 7/182* (2006.01)

REAR LENS

CROSS REFERENCE TO RELATED APPLICATIONS

Claiming the benefit of provisional patent application No. 62/048,344 filed on Sep. 10, 2014.
1. In U.K. patent 3701 to Galland-Mason (1885), a reflector of any suitable form and material, such as a fit piece of silvered glass, was attached to an ordinary pair of spectacles onto the inner face of each lens at the outside edge with an adhesive cement. Hence, it had no means of adjustment and was permanently cemented onto the lens.
2. Another example was U.S. Pat. No. 1,359,576 to Colman (1920), which attempted to accomplish some sort of adjustment by attaching a removable mirror to the lens with a clip by an optician to accommodate the particular wearer's vision, and the lenses also had to be custom ground to form a recess to accept the mirror. This was a cumbersome, expensive, and permanent alteration to the lenses of the eyewear.
3. A mirror which presented the possibility of injury to the wearer's eyes in a mishap was U.S. Pat. No, 1,892,365 to Rowan (1932). The inventor's desire to achieve adjustability and economical production led to a gooseneck design which appeared to be a dangerous obstruction. Furthermore, the gooseneck itself was made of pliable wire, which could easily lose its adjustment and cause unwanted vibration.
4. Rather than a mirror, U.S. Pat. No. 2,739,508 to Reed (1956) and U.S. Pat. No. 3,423,150 to Freed (1969) presented glasses themselves. Reed's design required a rivet through holes in the lenses and was not removable once installed. Also its design projected the mirrors away from the lenses toward the wearer's eyes, and appeared dangerous. Freed's design required some form of support, such as a headband, and was unsightly and cumbersome.
5. U.K. patent DE 3823-366-A to Pupp (1990) again presented a design for eyeglasses incorporating mirrors on the lenses but was produced as a unit, with no means of adjustability.
6. U.S. Pat. No. 5,537,160 to King (1996) presented a small circular mirror design placed on the interior of the lens of eyewear which can not accommodate shields of motorcycle helmets and offers a limited rear field of view.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

This invention relates to removable rear viewing mirror attachments used to supplement one's view of the area behind them and to the side, which is adjusted by rotation associated therewith, and, more specifically mounted onto the exterior surface of the lens of eyewear for sports, motorcycle helmet shields, and especially the lens of eyewear for cycling.

BACKGROUND OF THE INVENTION

Road cycling in urban environments has become more popular as more people are starting to become more environmentally and health conscious. Cycling in urban environments and along country roads means that motorized vehicles and cyclist must share the road thus creating the potential of an accident. The increase in cycling popularity across major cities has resulted in more cyclists on the road thus resulting in an increase of accidents involving cyclists and fatalities.

Safety for cyclist has become a growing concern. While cycling in a metropolis you must always be aware of car doors swinging open as you're passing by, vehicles making sudden stops in front of you, pedestrians stepping into your path, a person stepping from behind a car and other objects that may suddenly appear in front of you. We are almost always ready to circumvent those obstacle course like challenges when we are constantly looking forward while cycling. Just as important as is for a cyclist to keep their eyes on the road ahead of them, it is equally important for cyclists to know what is approaching behind them. A large percentage of cyclist are hit while stopping in between cars at a stop light. Cyclists are susceptible to being hit from behind by an approaching car or truck, or by other cyclists. Cyclists must stay alert and constantly turn their heads to look behind them while also trying to keep looking forward.

The danger of city cycling triples and become more fatal when you are turning and maneuvering across the road-vehicles are approaching you from behind, and are moving along side of you (sometimes in a blind spot). The prevention of these dangers involves turning your head away from your view front to check for vehicles which it leaves a vulnerable moment for something fatal to happen in front on you.

Many city governments are taking steps to create bike lines on city streets and most are passing a law that mandates cyclists must incorporate bike lights to make sure that motorists see THEM. As a pro-cyclist that doesn't matter to us—there is still a possibility that even with lights a motorist may not see you sharing the road with them. We don't take those chances and understand that it is OUR responsibility to make sure that we see everything on the road in front of us, in the back of us, and on the side of us.

The Rear Lens eliminates three problems:

1) Having sharp metal, mirrored glass, or hard sharp pointed plastic around the eyes. Many cyclists that use rear-viewing mirrors currently on the market have fallen off their bikes and incurred eye injury from the viewing mirror. The Rear Lens which is made of high-quality mirrored plastic easily mounts directly onto the lens of the eyewear by way of a soft rubber suction cup designed specifically for the Rear Lens minimizes injuries by not being permanently attached and can easily breakaway from lens.

2) Taking ones eyes off the road that is in front of them to look back. The few seconds that one may take to look backwards could be the matter of serious injury, life or death, 3) Neck and shoulder pain—The Rear Lens was invented primarily to help eliminate neck and shoulder muscle pain that is caused from looking over ones shoulders while, riding a bike/motorcycle, etc. in the effort to quickly look backwards to check for safety to maneuver over into the next lane, or turn a corner.

BRIEF SUMMARY OF THE INVENTION

The semi-permanent/detachable rear view mirror, and will hereafter be referred to as the "rear lens", is a lightweight, non-harmful to the eye option for rear vision that is attached by suction cup to the exterior surface of the lens of eyewear for professional sports, the shield of a motorcycle helmet, and especially cycling eyewear. It is applied to the lens portion of a piece of eyewear with ease and removed with very little difficulty by squeezing the suction cup with fingers pulling away from the exterior surface of the lens of eyewear to reposition or transfer to a different pair of eyewear. The lens is left intact, unaltered, undamaged or scratched by the soft pliable plastic of the ball and socket suction cup. The physics of the ball and socket suction cup does not allow any movement of the attachment until one applies pressure by squeezing the suction cup and pulling away from the lens of the eyewear to remove. The rear lens is tremendously user friendly, and they can literally pop on and off, however the rear lens will not come off the eyewear until it is taken off. It is held by atmospheric pressure from the suction cup to the glasses.

The rear lens rear viewing attachment is made up of initially two pieces that becomes one; a +/−1" tall by +/−2" wide uniquely shaped thin piece of durable high-grade plastic mirror encased by a thin plastic housing with a short stem and ball at the +/−½" narrow inner corner that is placed inside of a specially designed suction cup socket. The unique shape of the plastic housing aerodynamic and has an airfoil. The design of the mirror is wider at the outer edge and narrower at the ball and suction cup. The mirror is the rotating piece that is allowed to rotate through the function of the ball and socket suction cup end. The mirror component may be adjusted and readjusted by the individual wearer without detaching it from the lens. The rear lens ideal placement is on the lower left or lower right side of the eyewear, close to the eye to increase and maximize rear visibility, which allows a reduced size of the mirror. It gives you the ability to see 360 degrees around you.

The components of the rear lens are a high grade durable but thin plastic mirror, the thin durable plastic mirror housing incorporating a short stem and ball, and ball and socket designed suction cup. It connects by popping the uniquely shaped mirror into its plastic housing which integrates a ball and stem, and placing the housing ball component into the socket suction cup. The suction cup adheres to the lens of eyewear/sports glasses which are integral to the invention. It allows semi-permanent attachment to the exterior surface of any lens component of eyewear and or shield of a protective helmet.

The ability to rotate from 0-45 degrees thus providing angular adjustment and a wide field of view, the size of the rear viewing mirror and proximity to the eye, the user simply peers into the mirror with the shift of the eye (without moving one's neck or taking their view away from what is ahead of them) to look at what is behind them. Each user can apply the Rear Lens to fit his/her line of vision and can easily be adjusted by swiveling the housing connection provided by the ball and socket design. However, the ball and socket has just enough friction between the pliable plastics as not to be moved by wind or bumps in the road as one cycles—it holds steady to one's field of vision placement and vibration is not transferred to the rear lens. It maintains its placement until the wearer moves it by applying very little force to the mirror to rotate it.

The socketed suction cup diameter is ¼" of an inch, a relatively small space as not to be intrusive to the wearer's sight. It does not interfere with the user's front view when ideally placed at the on the lower portion of the exterior surface of the lens component of eyewear and does not interfere with arm and hand movement. It's weight is less than 5 grams which does not cause discomfort/heaviness to the eyewear—it is nearly unnoticeable.

Applicability The Rear Lens can be used by all types of sports athletes, street police officers, motorcyclist (can attach to outside of helmets and is not affected by natural elements. It provides a greater level of awareness and safety for cyclists and other sport/motorcycle applications to prepare themselves to quickly maneuver out of danger of vehicles/trucks or other cyclist that are approaching from behind. Because of the soft pliable suction cup and the high grade plastic mirror and housing, in case of an accident and possibility of falling on the attachment, the rear lens will not injure the eye(s) of the wearer.

DETAILED DESCRIPTION OF THE INVENTION

This invention can best be understood with reference to the specific embodiments that are illustrated in the accompanying drawings and variations described below. While the invention will be so described, it should be recognized that the invention is not intended to be limited to the embodiments illustrated in the drawings; rather, the embodiments provided in this disclosure are intended to satisfy applicable legal requirements. The invention includes all alternatives, modifications, and equivalents that may be included within the scope and spirit of the invention as defined by the appended claims.

Figure 1:
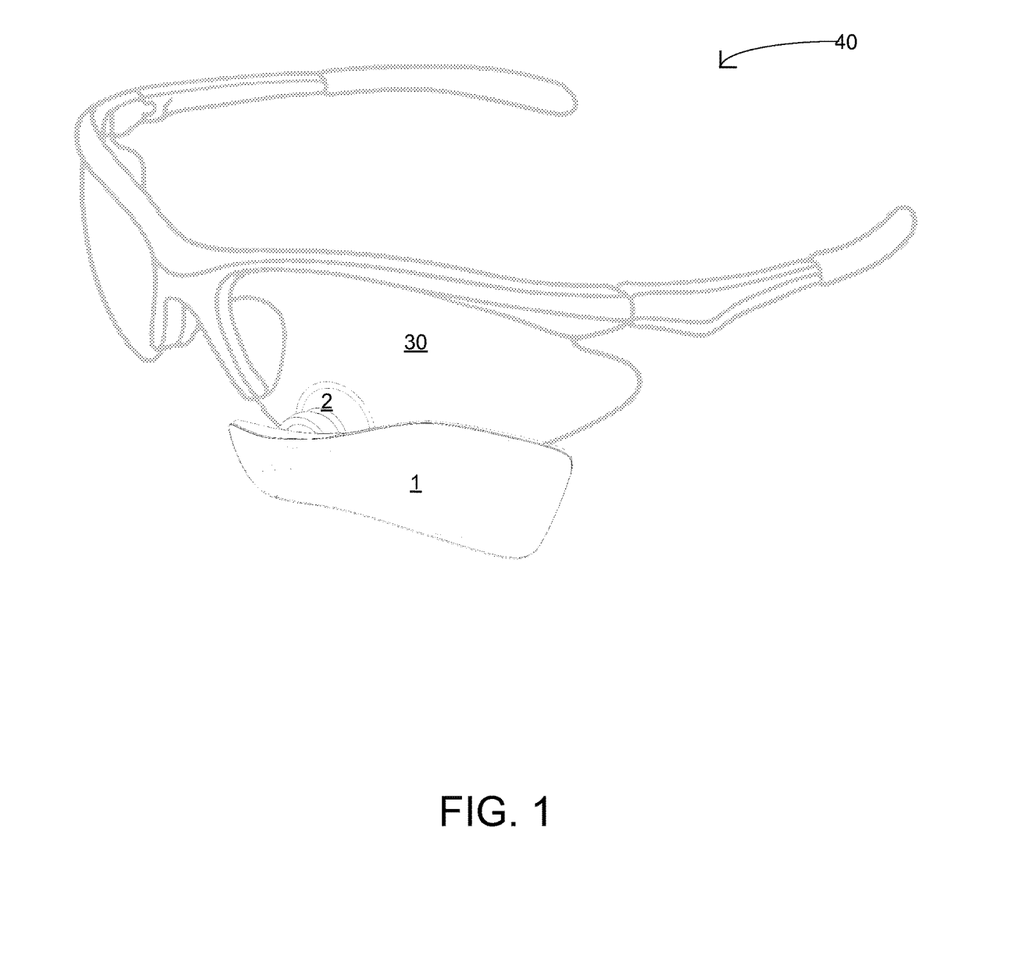
FIG. 1 Shows a perspective view of the rearview mirror mounted on of the exterior surface of the lens of eyewear, in particular the lens of sports eyewear.

FIG. 1 Illustrates generally at 40 a perspective view of one embodiment of the invention of the rear lens mounted onto the lens of the eyewear having a mirror 3 affixed to the eyewear, the invention shown in the context of the use of the invention. The lens of the eyewear in this context is a pair of cycling glasses. The rear view mirror is 1 is fixedly adjustable, removable, and mounted by 2 the socketed suction cup to 30 the lens of the eyewear at the lower left portion of the lens.

Figure 2:
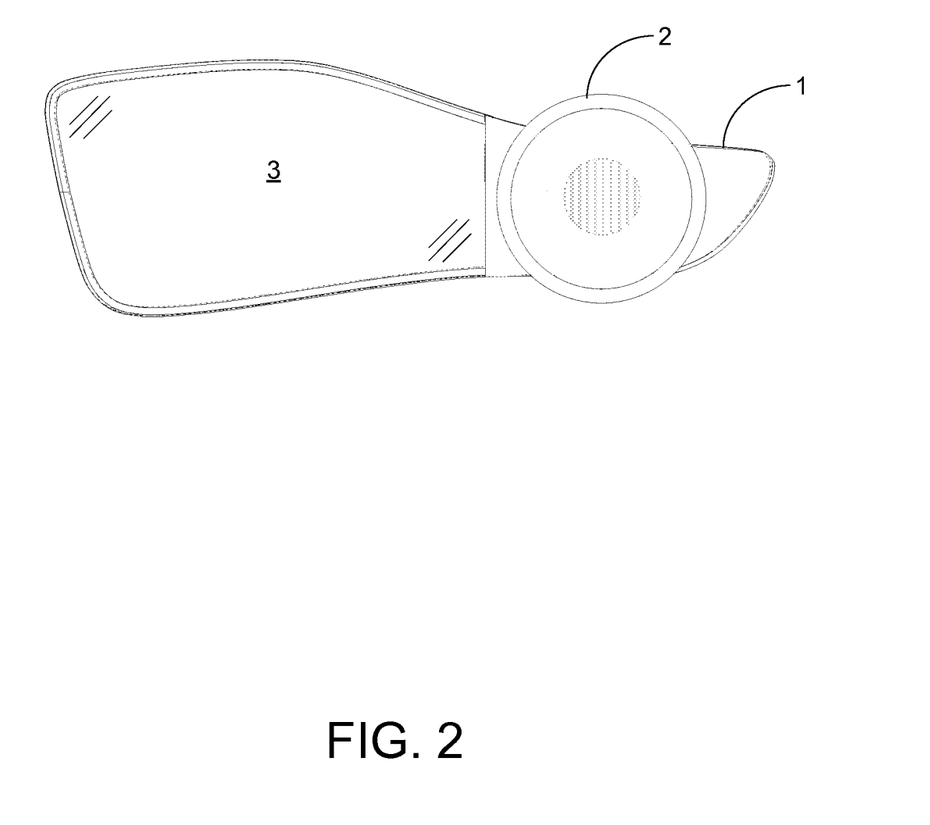
FIG. 2 Shows the back view of the rearview mirror, the view that the wearer would see it.
Figure 3:
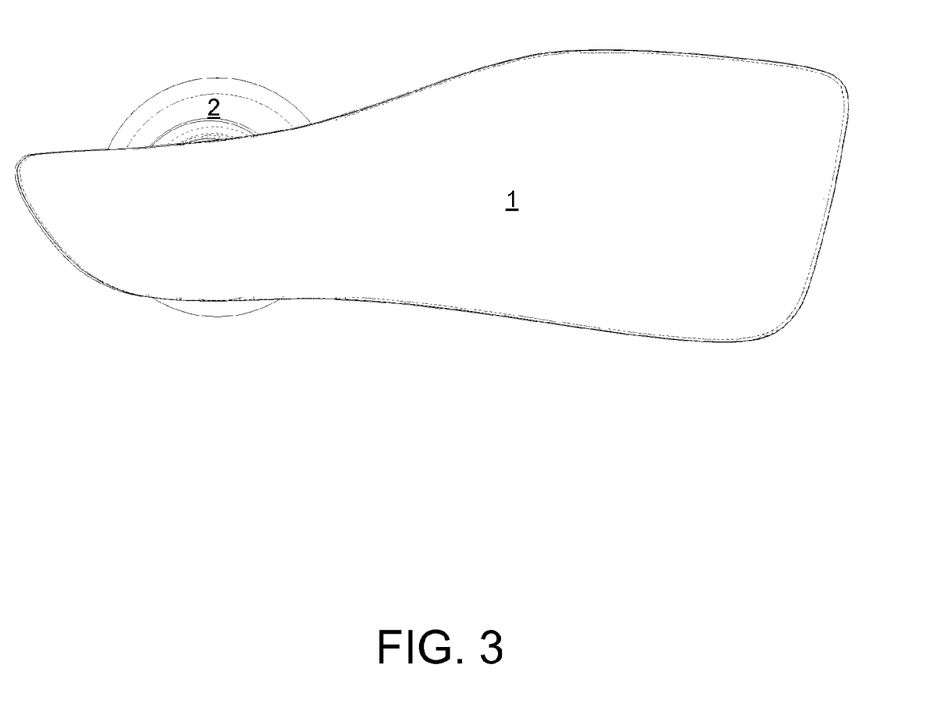
FIG. 3 Shows the front view of the rearview mirror.
Figure 4:
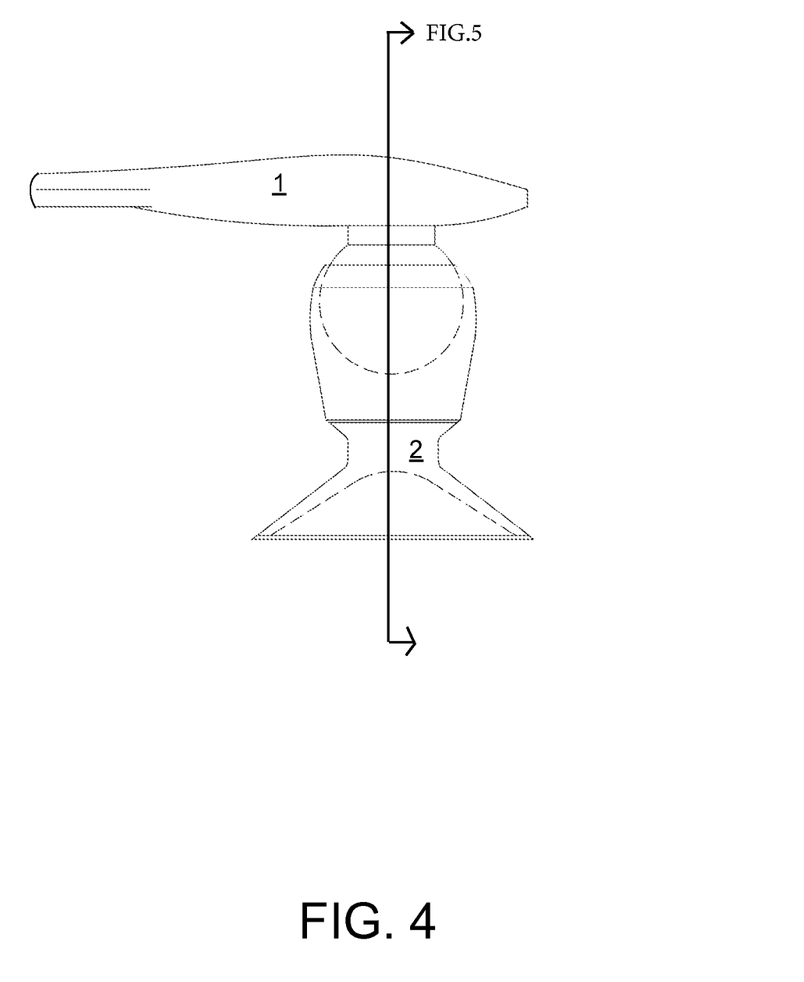
FIG. 4 Shows a side view of the rearview mirror.
Figure 5:
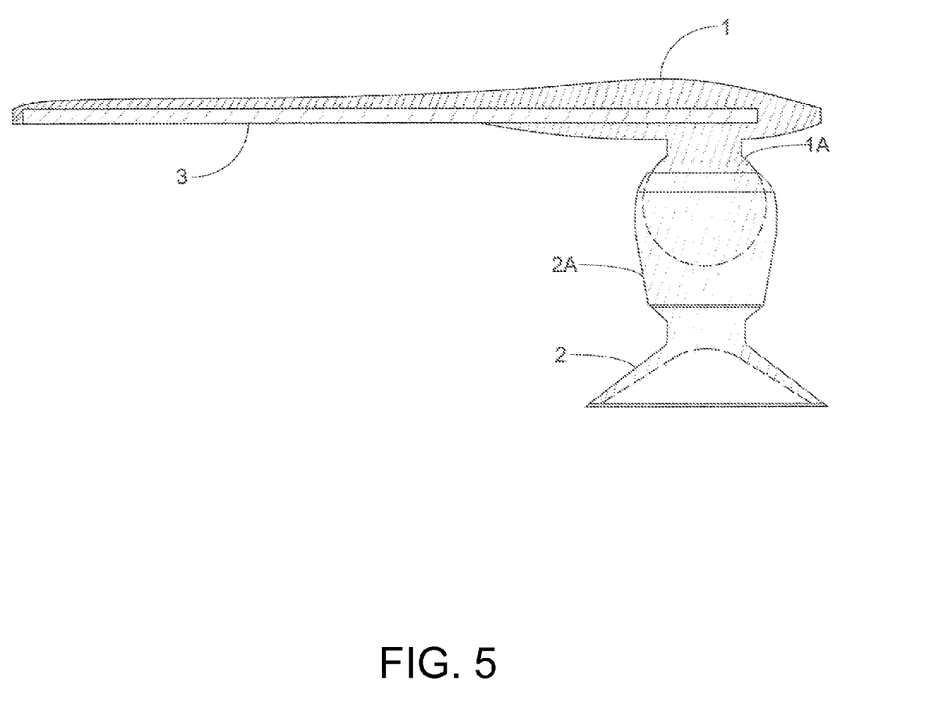
FIG. 5 Shows a section of the rearview mirror, also showing it's embodiments of the plastic housing stem and ball inside of the socketed suction cup.
Figure 6:
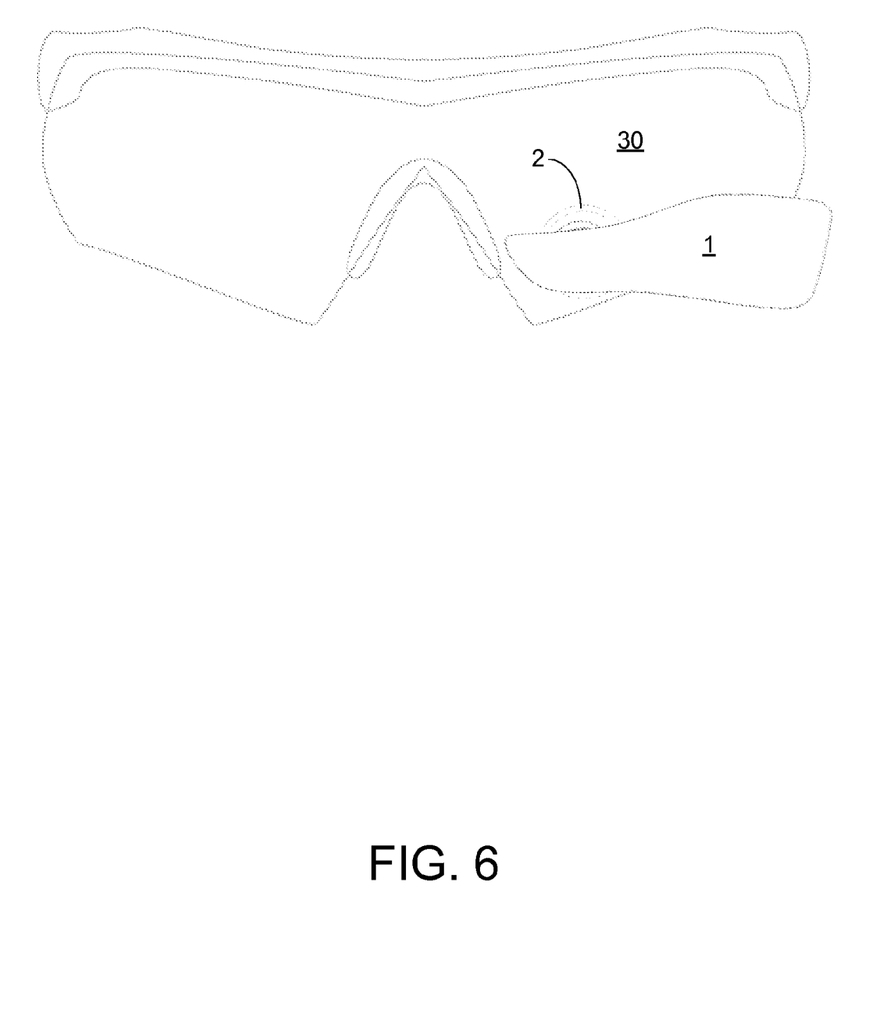
FIG. 6 Shows the front view of the rear view mirror as it would attach onto the lens of sports eyewear.
Figure 7:
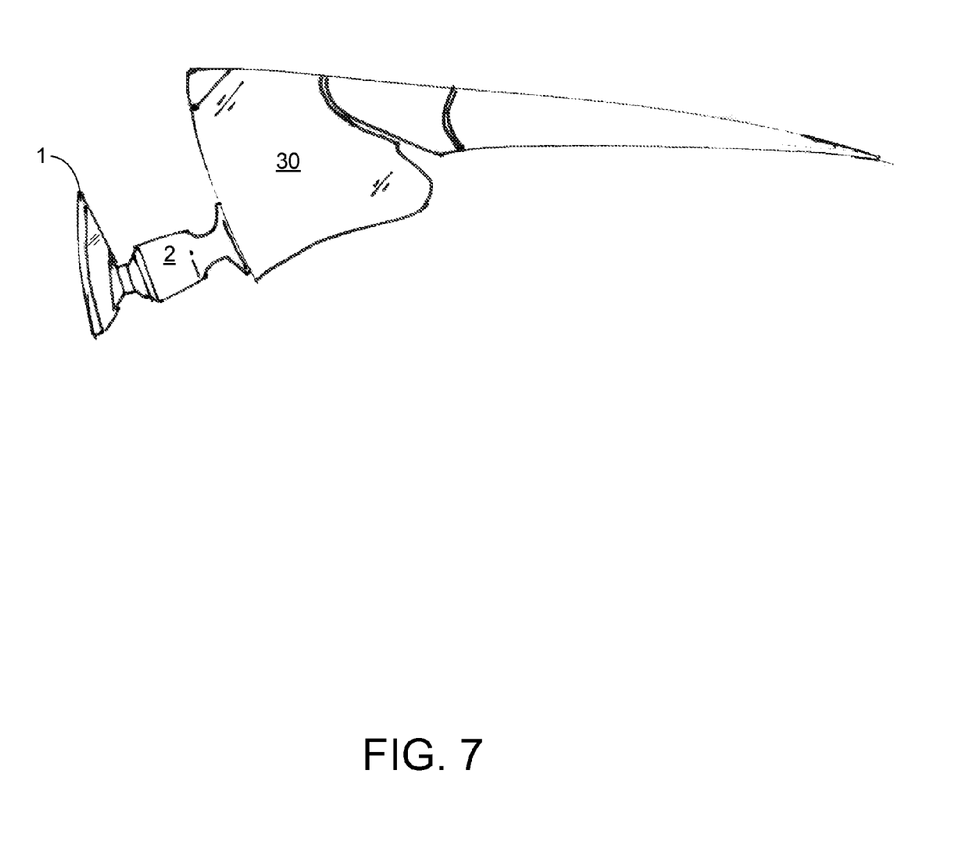
FIG. 7 Shows the side view of how the rearview mirror is mounted onto the lens of sport eyewear.
Figure 8:
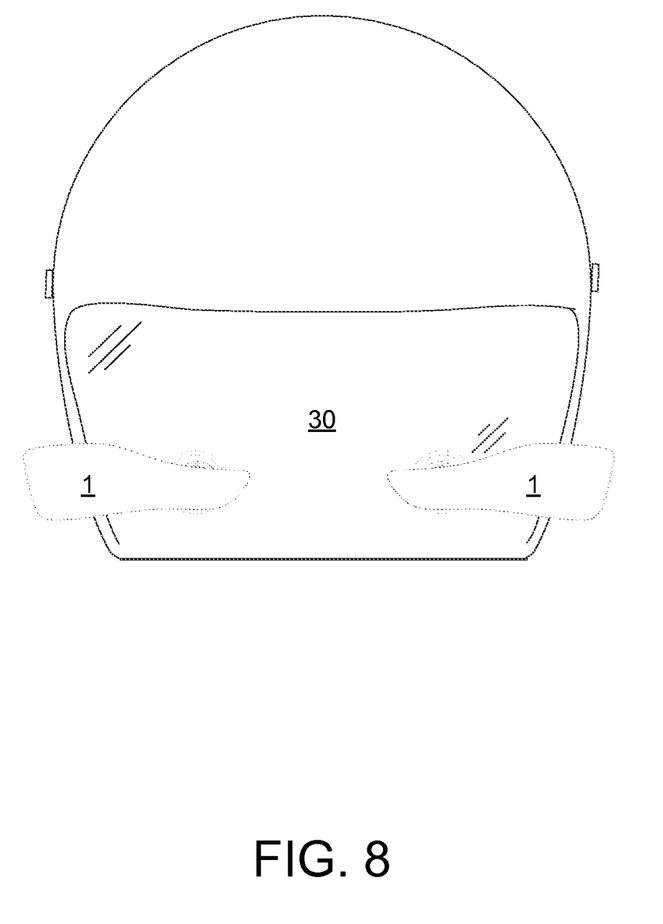
FIG. 8 Shows the side view of how the rearview mirror is mounted to the lens of a shield of a motorcycle helmet.

FIG. 2 Illustrates the wearer's view of the rear lens which 3 mirror is facing the face of the wearer. It shows the interior of 2 socketed suction cup and 1 the plastic housing that encases the 3 mirror.

The rear lens plastic housing and socketed suction cup is created by first having an artist sculpt the aerodynamic shape by hand. It is then casted by a rubber mold to create a metal mold. The metal mold can then be used to create plastic mold injections by a plastic mold injection facility. The plastic mirror 3 die cut to the shape of the 1 plastic housing design. It snaps into the plastic housing that incorporates the stem and ball and reinforced by glue. The mirror 3 and 1 plastic housing component is then inserted into the 2 socketed suction cup.

The invention claimed is:

1. Rearview mirror consisting of a combination of pliable and durable plastic semi-permanently mounted onto the exterior surface of the lens of eyewear by suction cup enabling the wearer to view objects behind them and to the side of them, the rearview mirror comprising, in combination of, a high-grade mirrored surface enclosed in plastic housing that incorporates a supporting stem and ball on one end of the mirror, the ball that is placed into a socketed suction cup allowing rotatable function, socket suction cup flush mounted onto the lens of the eyewear, whereby the wearer establishes in the mirrored surface a rear view and adjustable line of vision to view objects behind the wearer reflected in the mirrored surface and can remove the rearview mirror from the lens of the eyewear when not in use.

2. A rearview mirror of claim 1 mounted onto the lens of eyewear for sports, motorcycle helmet shields, and especially cycling eyewear.

3. A rearview mirror of claim 1 mounted onto the lens of eyewear for sports, motorcycle helmet shields, and especially cycling eyewear by suction cup.

4. The rear view mirror of claim 1 having the ability of angular adjustment of said mirrored surface through the rotational function of the ball and socket design allowing angular adjustment in three dimensions in roll, pitch up or pitch down between 0 and 45 degrees about a paralleled vertical axis to the lens of eyewear and, yaw by 0 and 45 degrees about a left or right horizontal axis to the lens of eyewear.

5. The rear view mirror of claim 1 having a aerodynamic asymmetrical shape that is approximately less than 1 inch tall at the mirrored surface end and approximately 2 inches long that narrows down to approximately ½" in the interior corner where the ball and socket is located.

6. The rearview mirror of claim 1 wherein the angular adjustment, once accomplished, is semi-permanently affixed due to the pliable rubber-like plastic of the socketed suction cup and friction of the stem and ball.

7. The rearview mirror of claim 1 whereas the suction cup is approximately ¾" tall to allow the mirror and plastic housing stem component to be set back away from the lens at approximately 1" allowing a depth of field required for a rearview.

8. The review mirror of claim 1 wherein mounted onto the exterior surface of the lens of eyewear for sports, motorcycle helmet shields, especially cycling eyewear by suction cup.

9. The rearview mirror of claim 1 wherein the plastic housing supporting stem ball is placed into a socketed suction cup for rotational ability.

10. The rearview mirror of claim 1 wherein the suction cup incorporates a socket.

11. The rearview mirror of claim 1 wherein the mirrored surface is housed by a plastic encasement.

12. The rearview mirror of claim 1 wherein the plastic housing incorporates a cavity for the mirror surface and stem and ball.

13. The rearview mirror of claim 1 wherein is transferable to the exterior surface of either or both lenses (eft or right side) on said eyewear lens or shield of protective head gear and or motorcycle helmet shield.

14. A rearview mirror mounted onto the exterior surface of the lens of eyewear for enabling the wearer to view objects behind them, the rearview mirror comprising, in combination:
   a. A semi-permanent mirror adjustably mounted to the lens of eyewear and set back away from lens by the depth of approximately 1" to enable the wearer to establish an adjustably fixed and rewardly line of sight reflected in the mirror, enabling the wearer to view objects behind them and to the side of them, the mirror comprising:
      i. A mirrored surface
      ii. A plastic encasement of said mirror surface with a stem and ball affixed at one end extending into a pliable rubber socketed suction cup.
      iii. A socketed suction that is flush mounted to the lens of eyewear that allows the ball to rotate inside of it enabling hand adjustment of rear line of sight reflected in the mirror.

15. The rearview mirror in claim 14 wherein a asymmetrically shaped mirror of approximately 1" tall by 2" wide with the narrow end having plastic encasement incorporating a stem and ball placed into a socketed suction cup.

16. The rearview mirror in claim 14 wherein the mirrored surface can be removed by squeezing the socketed suction cup.

17. The rearview mirror in claim 14 wherein can be hand adjusted for angular comfort as to not put strain on the eye to view rear line of sight.

\* \* \* \* \*